United States Patent [19]

Kaufman et al.

[11] Patent Number: 5,285,513
[45] Date of Patent: Feb. 8, 1994

[54] OPTICAL FIBER CABLE PROVIDED WITH STABILIZED WATERBLOCKING MATERIAL

[75] Inventors: Stanley Kaufman; Jim J. Sheu, both of Dunwoody, Ga.

[73] Assignee: AT&T Bell Laboratories, Murray Hill, N.J.

[21] Appl. No.: 983,491

[22] Filed: Nov. 30, 1992

[51] Int. Cl.$^5$ .............................................. G02B 6/44
[52] U.S. Cl. ...................... 385/109; 252/194; 252/304; 385/141; 523/173
[58] Field of Search ............... 385/100, 102, 105, 109, 385/110, 141; 523/173; 252/194, 302, 304

[56] References Cited

U.S. PATENT DOCUMENTS

| | | | |
|---|---|---|---|
| 4,701,016 | 10/1987 | Gartside, III et al. | 385/100 |
| 4,803,244 | 2/1989 | Umpleby | 525/105 |
| 4,826,278 | 5/1989 | Gartside, III et al. | 385/105 |
| 4,836,640 | 6/1989 | Gartside, III et al. | 385/109 X |
| 4,844,575 | 7/1989 | Kinard et al. | 385/141 X |
| 5,187,763 | 2/1993 | Tu | 385/100 |

*Primary Examiner*—John D. Lee
*Attorney, Agent, or Firm*—Donald E. Hayes, Jr.

[57] ABSTRACT

A cable of this invention includes a core comprising a plurality of coated optical fibers and a filling composition of matter which is disposed about the fibers. Typically, the fibers and the filling material are diposed within a tubular member which is disposed within a sheath system. The sheath system include longitudinally extending strength members and a plastic jacket. The filling composition which fills interstices in the core is one which includes an oil constituent which is a relatively high molecular weight aliphatic hydrocarbon. The aliphatic hydrocarbon is a synthetic oil such as polyalphaolefin or mineral oil. A relatively large percent by weight of an antioxidant system is used to prevent thermal oxidative degradation of the filling material as well as of materials in contact with the filling material. Advantageously, for stabilization and metal deactivation, the composition includes zinc dialkyldithiophosphate or diaryldithiophosphate. A styreneethylene propylene copolymer is also included in order to reduce oil separation of the filling material. A fumed silica is used to impart gel properties to the material.

12 Claims, 1 Drawing Sheet

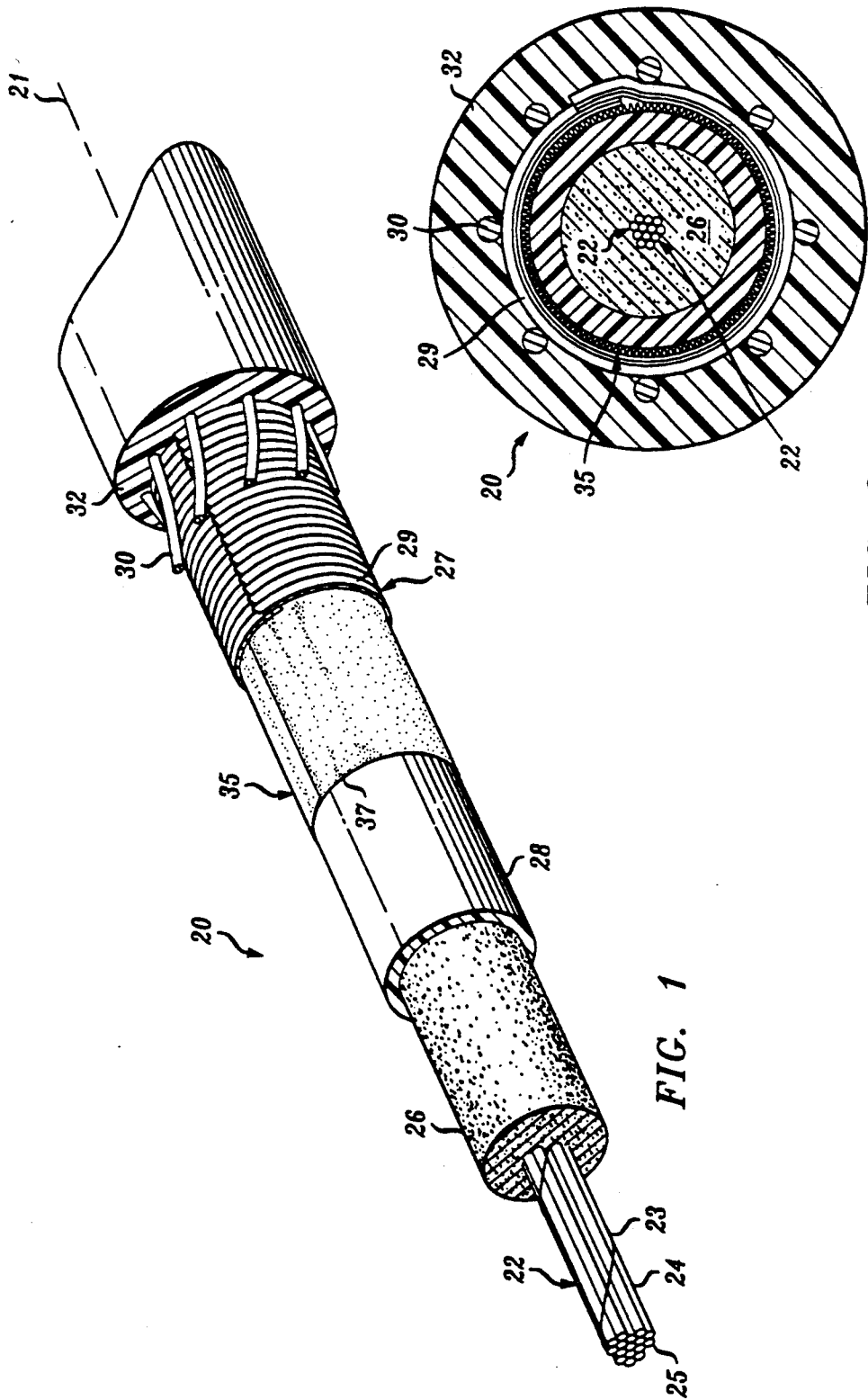

OPTICAL FIBER CABLE PROVIDED WITH STABILIZED WATERBLOCKING MATERIAL

TECHNICAL FIELD

This invention relates to an optical fiber cable provided with a stabilized waterblocking material. More particularly, the invention relates to a cable provided with a dripless, non-bleeding, optical fiber coating-compatible and stabilized waterblocking material which fills interstices in a core of the cable.

BACKGROUND OF THE INVENTION

In the cable industry, it is well known that changes in ambient conditions lead to differences in water vapor pressure between the inside and the outside of a plastic cable jacket. This generally operates to diffuse moisture in a unidirectional manner from the ouside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of a metallic conductor cable.

Furthermore, water may enter the cable because of damage to the cable which compromises its integrity. For example, rodent attacks or mechanical impacts may cause openings in the sheath system of the cable to occur, allowing water to enter, and, if not controlled, to move longitudinally along the cable into splice closures.

In the prior art, various techniques have been used to prevent the ingress of water through the sheath system of a cable and along the core. For example, a metallic shield which often times is used to protect a metallic conductor cable against lightning and rodent attacks is provided with a sealed longitudinal seam. However, the forming of a shield about a cable core requires the use of relatively low manufacturing line speeds. Also, the use of a metallic shield is destructive of the otherwise all-dielectric property of an optical fiber cable. Further, lightning strikes may cause holes in a metallic shield.

It is not uncommon to include provisions in addition to or as an alternative to a metallic shield for preventing the ingress of water into the core. Waterblocking materials have been used to fill cable cores and to coat portions of cable sheath systems to prevent the movement longitudinally thereof of any water which enters the cable. Such a material, typically is referred to as a filling material. In optical fiber cables, a further important function of a filling material is the maintenance of the optical fibers in a low stress state.

As taught in the prior art, U.S. Ser. No. 07/691,770 filed on Apr. 26, 1991 in the name of C. F. Tu, now U.S. Pat. No. 5,187,763, a cable filling material, especially an optical fiber cable filling material, should meet a variety of requirements. Among them is the requirement that the physical properties of the cable remain within acceptable limits over a rather wide temperature range e.g., from about −40° to about 76° C. It is desirable that the composition of matter of the filling material be substantially free of syneresis, i.e. have an ability to retain uniform consistency, over the temperature range. Generally, syneresis is controlled by assuring dispersion of an adequate amount of colloidal particles or other gelling agent. Other desirable properties of the compositions include thermal oxidation resistance.

Optical fiber cables have made great inroads into the communications cable market. Although the presence of water itself within an optical fiber cable is not necessarily detrimental to its performance, passage of the water along the cable interior to connection points or terminals or associated equipment inside closures, for example, may cause problems. In both cases, under freezing conditions, the performance of optical fiber deteriorates quickly.

Further complicating the optical fiber cable situation is the introduction of a waterblocking filling material into the cable core in order to prevent the incursion of water. Suitable waterblocking materials in use must yield under strains experienced when the cable is made or handled. Otherwise, movement of the optical fibers within the cable would be prevented and the fibers would buckle because they contact, with a relative small periodicity, a surface of the unyielding filling material. The smaller the periodicity of the fibers when contacting such an unyielding surface, the greater a loss which is referred to as microbending loss.

Typically, microbending loss in optical fiber cables is more difficult to control at long wavelengths than at short ones. Thus the requirements on the mechanical properties of a fiber cable filling material are typically substantially more severe for cable that is to be used at 1.55 $\mu$m, for example, than they are if the cable is to be used at shorter operating wavelengths of 1.3 $\mu$m, for example. Although, it has been found that some prior art filling materials perform quite satisfactorily at wavelengths up to about 1.3 $\mu$m, it has also been found that this is often not the case at longer wavelengths.

Because silica-based optical fibers typically have their lowest losses at or near the 1.55 $\mu$m wavelength, there is great interest in operating optical fiber telecommunication systems at approximately that wavelength. Thus, it is important to have available filling compositions for optical fiber cable that has no significant cabling-induced losses at long wavelengths, including about 1.55 $\mu$m.

Filling compositions for use in optical fiber cables should have a relatively low shear modulus, $G_e$. However, it has been determined that, at least for some applications, a low value of $G_e$ of the filling material is not sufficient to assure low cabling loss, and that a further parameter, the critical yield stress, $\sigma_c$, needs to be controlled because it also affects the optical performance of fibers in a cable with a filling material.

Incorporating a block copolymer into the grease-like composition of matter allows a reduction of the amount of colloidal particles that has been added to the mixture to prevent syneresis of the gel. This reduction can result in cost savings. Furthermore, it makes possible the formulation of less bleeding compositions having a very low critical yield stress.

Waterproofing filling materials for use in cables also must pass industry standard drip tests. To pass these tests, filling materials in cable cores must be retained as cable samples, suspended vertically, and subjected to specified elevated temperatures. Some prior art materials, which have been used, perform satisfactorily with respect to microbending and associated losses, but they bleed out excessively and have problems in meeting current drip tests. Also, it is desired that the low mean added losses exhibited by some prior art filling materials at least be met by filling materials which pass the drip test and have suitable low temperature properties.

Oil separation is a property of a grease-like material which describes the tendency to bleed oil during its lifetime. What is desired is a filling material which has an oil separation no greater than 5% when centrifuged at a rotational speed equivalent to a relative centrifugal force of about 26,000 G. for two hours.

The viscosity of the sought after filling material also is important with respect to processing. Because cable drip is related to oil separation, constraints on the sought after filling material include oil separation, critical yield stress and viscosity. These constraints usually are antagonistic to each other. For example, a reduction of oil separation and an increase in cable drip temperature require high viscosity and yield stress whereas to facilitate processing and to reduce optical loss requires low viscosity and yield stress.

Another problem relating to filled optical fiber cables is the compatibility of the filling material with some coating materials which are disposed about drawn optical fiber to protect the optical fiber. If compatibility is lacking, the performance and/or the appearance of the optical fiber could be affected adversely. The compatibility of otherwise suitable prior art filling materials with some coating materials, particularly those which are relatively soft, is something less than desired.

The filling composition of matter is one which includes an oil constituent which is a relatively high molecular weight aliphatic hydrocarbon. The aliphatic hydrocarbon constituent may be a synthetic oil or mineral oil such as polyalphaolefin, for example, or a relatively high molecular weight mineral oil. Relatively low pour point oils are used in order to improve optical loss at low temperatures. A relatively large percent by weight of an antioxidant system is used to prevent thermal oxidative degradation of the filling material as well as of materials in contact with the filling material. A low molecular weight copolymer is also used to reduce oil separation of the filling material.

Although the above-mentioned composition is suitable from many standpoints for ease in waterblocking in an optical fiber cable, there is a desire to improve cost and performance of the composition.

What is sought after is a waterblocking composition which has a lower cost and improved performance over those used in the past. More particularly one of the constituents may not only give improved performance but also may provide synergistic properties.

SUMMARY OF THE INVENTION

The foregoing perfomance problems of the prior art have been improved by a cable of this invention having a filling composition of matter disposed in a core thereof. A cable of this invention includes a core comprising a plurality of coated optical fibers and a filling composition of matter which is disposed about the fibers. Typically, the fibers and the filling material are disposed within a tubular member which is disposed within a sheath system. The sheath system includes longitudinally extending strength members and a plastic jacket.

The filling composition which fills interstices in the core is one which includes an oil constituent which is a relatively high molecular weight aliphatic hydrocarbon. The aliphatic hydrocarbon is a synthetic oil or mineral oil such as polyalphaolefin. A relatively large percent by weight of an antioxidant system is used to prevent thermal oxidative degradation of the filling material as well as of materials in contact with the filling material. Advantageously, for stabilization and metal deactivation, the composition includes zinc dialkyldithiophosphate or zinc diaryldithiophosphate. A styrene-ethylene propylene copolymer is included in order to reduce oil separation of the filling material. A fumed silica is also used to impart gel properties to the material.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of an optical fiber cable of this invention which has a core in which is disposed a filling material;

FIG. 2 is an end view in section of the cable of FIG. 1;

DETAILED DESCRIPTION

Referring now to FIGS. 1 and 2, there is shown a communications cable which may incorporate the improved filling material of the present invention and which is designated generally by the numeral 20 and which has a longitudinal axis 21. It includes a core 22 comprising optical fibers 25—25 which may be arranged in one or more units 24—24. Each of the optical fibers is provided with a protective coating system which typically includes an inner primary coating layer and an outer secondary coating layer. Also, each of the coated fibers may be buffered with an outer layer of polyvinyl chloride (PVC), for example. Each of the units 24—24 may be wrapped with a binder ribbon 23. The core 22 includes a waterblocking material 26 which is disposed within a tubular member 28 of a sheath system 27. The tubular member 28 often is referred to as a core tube.

The tubular member 28 may be enclosed by a metallic shield 29 and an outer plastic jacket 32. The sheath system 27 also may include strength members 30—30. Also, a waterblocking tape 35 may be wrapped about an outer surface of the core tube 28. The tape 35 may be a waterblocking tape which is disclosed, for example, in U.S. Pat. No. 4,867,526 which issued on Sep. 19, 1989 in the name of C. J. Arroyo. Also, the filling material 26 may be used to fill the core of a cable which includes optical fiber ribbons such as those disclosed in U.S. Pat. No. 4,900,176 which issued on Feb. 13, 1990 in the names of K. W. Jackson, et al.

Constraints on the sought after filling material which includes an oil constituent include oil separation, and associated cable drip temperature, critical yield stress and viscosity of the filling material. As mentioned hereinbefore, these constraints usually are antagonistic to each other. Priorly, it has been demonstrated that low pour point oils produce filling materials the critical yield stress of which at low temperatures decreases with decreasing pour point. The pour point of a material is the lowest temperature at which a sample of the material may be poured. Theoretically, the use of a low pour point oil is conducive to the reduction of optical loss at low temperatures. Cable construction and cable processing conditions also affect the optical performance of fibers and, therefore, the benefit of a low pour point oil may become obscured.

The critical yield stress of a filling material is considered to affect the optical performance of fibers in a cable filled with the filling material. The prior art filling material typically has a critical yield stress of 0.0016 psi at room temperature and 0.0096 psi at −40° C. The critical yield stress of the filling material 26 should be such that it does not cause an increase in optical fiber loss over that of prior art filling materials at all temperatures.

The viscosity requirement is needed to accommodate processing, not cable performance. The viscosity of prior art filling material as measured by a helipath viscometer should be 15 to 45 units using spindle TB at room temperature. In order to assure the waterhead resistance of an optical fiber cable, it is preferred to have the helipath viscosity in excess of 28 units. It is desired that the viscosity of the filling material be in the vicinity of that of prior art filling materials so that presently available processing facilities can be used.

The composition of matter of the filling material 26 which is used to fill interstices in the core of the cable 20 and which meets the foregoing requirements includes an oil constituent system in the range of about 85 to about 92 percent by weight. A suitable oil constituent is a relatively high molecular weight aliphatic hydrocarbon. By relatively high in this description is meant a molecular weight in excess of about 600.

The aliphatic hydrocarbon constituent may be a relatively high molecular weight mineral oil such as Kaydol available from the Witco Corporation, for example. In the alternative, the aliphatic hydrocarbon constituent may be a synthetic oil or mineral oil such as, polyalphaolefin oil, polypropene oil or polybutene oil for example. Mixtures of polyalphaolefin with mineral oils and polybutene oils also may be used. In a preferred embodiment, the composition includes about 86.7% by weight of a polyalphaolefin such as SHF 402 oil available from the Mobil Corporation. The synthetic oil or mineral oil of the preferred embodiment is a hydrogenated oligomer of alpha-decene and has an average molecular weight of 1280. The viscosity of the oil at 100° C. is approximately 40 centistokes. It has a pour point of approximately −40° C.

The polyalphaolefin aliphatic hydrocarbon also may be one which is characterized by a viscosity in the range of about 10 to 60 centistokes at 100° C. Suitable polybutene oils have a viscosity in the range of 190 to 300 centistokes whereas a suitable mineral oil has a viscosity greater than 150 SUS which equates to about 35 centistokes. If it has a viscosity substantially greater than 10 centistokes, such as, for example, 40 centistokes, the filling material may become more compatible with the coated optical fiber.

Importantly, included in the composition of the filling material 26 in accordance with the present invention is an antioxidant system in the amount of about 1.3% by weight. The antioxidant system of the preferred embodiment of this invention comprises two antioxidant constituents. In particular, one of the antioxidant constituents may be zinc diaryldithiophosphate or dialkyldithiophosphate (ZDDP). The other antioxidant constituent is high molecular weight, hindered phenolic sulfide which is relatively soluble in mineral oil. Acceptable ZDDP antioxidants are available from the Lubritol Corporation under the tradename Lubritol 1370, and 1395 while an acceptable constituent as the phenolic sulfide is available from the Ciba-Geigy Company under the trade designation Irganox 1035. In a preferred embodiment, the filling composition includes approximately 1.0% by weight of Lubritol 1370 and 0.3% by weight of Irganox 1035. This antioxidant system improves the performance of oil.

Advantageously, the ZDDP has other desirable properties. It also serves as an anti-corrosion agent Not to be overlooked is the reduced cost of ZDDP over other stabilizers.

Exemplary compositions of this invention are shown in TABLES I and II, with the constituents being given in percent by weight. A summary of properties also is presented in each TABLE. Included in the TABLES are measurements of the swell of the primary optical fiber coating material, viscosity, oil separation and yield stress at room temperature. Cable drip test results at 65° C. are also provided in some of the TABLES.

TABLE I

| COMPOSITION & PROPERTIES OF THE FILLING MATERIAL | | | | | | | |
|---|---|---|---|---|---|---|---|
| Composition (% by wt) | | | | | | | |
| | Oil | | Fumed Silica Cab-O-Sil | Copolymer Kraton | Antioxidant | | |
| | | | | | Lubrizol | Irganox | Lubrizol |
| Ex. (1) | Kaydol (2) | SHF 402 (3) | TS720 (4) | G1701 (5) | 1395 (6) | 1035 (7) | 1370 (8) |
| A | — | 86.7 | 6.0 | 6.0 | — | 0.3 | 1.0 |
| B | — | 86.7 | 6.0 | 6.0 | — | 0.3 | 1.0 |
| C | — | 86.7 | 6.0 | 6.0 | — | 0.3 | 1.0 |
| D | — | 86.2 | 6.0 | 6.0 | — | 0.3 | 1.5 |
| E | 86.53 | — | 6.0 | 6.0 | 1.17 | 0.3 | — |
| F | 85.87 | — | 6.0 | 6.0 | 1.83 | 0.3 | — |
| G | 86.7 | — | 6.0 | 6.0 | — | 0.3 | 1.0 |
| H | 90.0 | — | 4.5 | 4.2 | — | 0.3 | 1.0 |

| Ex. (1) | OIT at 220° C. (min) (9) | Primary Coating Swell (Vol. %) (10) | Hellpath Viscosity (Units) (11) | Oil Sep. (%) (12) | Yield Stress (psi) (13) | Drip Test | |
|---|---|---|---|---|---|---|---|
| | | | | | | at 65° C. (14) | at 70° C. (15) |
| A | 26.5 | — | 35.1 | 1.34 | <0.002 | Pass | — |
| B | 28.6 | 5.03 | 32.4 | 2.14 | 0.0027 | Pass | — |
| C | 33.4 | — | 33.5 | 1.63 | 0.0037 | — | Pass |
| D | 31.8 | — | — | — | — | — | — |
| E | 49.5 | 0 | — | — | — | — | — |
| F | 56.5 | 0 | — | — | — | — | — |
| G | 45.1 | 0 | — | — | — | — | — |
| H | 34.5 | 0 | 20.2 | — | 0.0010 | — | Pass |

TABLE II

STABILIZATION FOR FILLING COMPOUND
Kraton G-1701, 6 g; CAB-O-SIL TS 720, 6 g;

| 220° C. | LUBRIZOL 1370 (60%) wt. g | LUBRIZOL 1395 (60%) wt. g | IRGANOX 1076 wt. g | IRGANOX 1035 wt. g | OIT FOUND min. | OIT PREDICTED avg. | OIT PREDICTED min. |
|---|---|---|---|---|---|---|---|
| Kaydol, 86.53 g |  | 1.17 | 0.3 |  | 32.90 |  |  |
|  |  | 1.17 | 0.3 |  | 34.65 |  |  |
|  |  | 1.17 | 0.3 |  | 35.80 | 34.4 | 24.9 |
| Kaydol, 85.87 g |  | 1.83 | 0.3 |  | 34.50 |  |  |
|  |  | 1.83 | 0.3 |  | 33.60 |  |  |
|  |  | 1.83 | 0.3 |  | 30.50 | 32.9 | 38.0 |
| Kaydol, 85.87 g |  | 1.83 |  | 0.3 | 57.20 |  |  |
|  |  | 1.83 |  | 0.3 | 56.10 |  |  |
|  |  | 1.83 |  | 0.3 | 56.10 | 56.5 | 60.0 |
| Kaydol, 86.53 g |  | 1.17 |  | 0.3 | 54 |  |  |
|  |  | 1.17 |  | 0.3 | 48.3 |  |  |
|  |  | 1.17 |  | 0.3 | 46.3 | 49.5 | 46.9 |
| Kaydol, 86.00 g |  |  | 1.7 | 0.3 | 34.15 |  |  |
|  |  |  | 1.7 | 0.3 | 32.51 |  |  |
|  |  |  | 1.7 | 0.3 | 27.74 | 31.5 | 32.2 |
| Kaydol, 86.7 g | 1 |  |  | 0.3 | 47.67 |  |  |
|  | 1 |  |  | 0.3 | 43.55 |  |  |
|  | 1 |  |  | 0.3 | 44.12 | 45.1 | 43.5 |

The optimum concentrations of antioxidants in the stabilization system of the present invention were derived from linear regression of the data developed from experiments listed in TABLE I. As an example, a filling compound formulation used included mineral oil, Kaydol (in the amounts depicted in TABLE I), 6% by weight of Kraton 1701, 6% by weight of Cab-O-Sil TS-720 and varying levels of antioxidants.

In general, the oxidative induction time (OIT) value is an indication of the time when the material being tested begins to oxidize. Therefore, the higher the OIT value, the slower the material begins to oxidize. In other words, an antioxidant system with a higher OIT would inhibit oxidation better than a system with a lower OIT value. The antioxidant system of the present invention improves the performance of the oil. The oxidative induction time of the oil of the composition increases with the use of this antioxidant system.

The OIT may be determined by differential scanning calorimetry. Specifically, a thermal analyzer equipped with differential scanning calorimetric cells manufactured by TA Instruments of New Castle, Del. (formerly known as E. I. DuPont Instruments) was used to measure the OIT values presented herein. Furthermore, as stated, the particular antioxidant evaluated as presented in TABLE II included Lubrizol 1395, which is a zinc $C_1$–$C_{14}$ alkyldithiophosphate, Irganox 1076, which is a hindered phenol manufactured by Ciba-Geigy, and Irganox 1035.

The oil constituent needs to be thickened so that it will not run out of a cable and so that oil separation is reduced. Oil separation or syneresis is a property of a filling material which describes the tendency to bleed oil during the lifetime of the filling material. One prior art filling material is known to separate oil if left undisturbed for a certain period of time. The syneresis is usually a slow process and, therefor, has to be determined by an accelerated method, centrifugation. As mentioned hereinbefore, it is desired that the filling material 26 be characterized by a 5% maximum oil separation when centrifuged at a rotational speed equivalent to a relative centrifugal force of 26,000 G for two hours. In order to accomplish this, inorganic and organic thickening agents are included in the composition of the filling material.

Colloidal fillers are used as inorganic thickening agents to adjust the yield stress of the composition. Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior often is referred to as thixotropic and is desirable to facilitate processing.

Colloidal fillers useful in the cable 20 include colloidal silica, either hydrophilic or hydrophobic, preferably a hydrophobic fumed silica having a BET surface area between about 50 and about 400 $m^2$/gm. The higher the surface area, the lower the oil separation. An increase in the fumed silica level decreases oil separation, but adversely increases the critical yield stress and the viscosity of the grease. An example of a hydrophobic fumed silica is a polydimethylsiloxane-coated fumed silica having a BET surface area of about 80–120 $m^2$/gm, containing about 5% b.w. carbon, and being available from the Cabot Corporation of Tuscola, Ill. under the trade designation Cab-O-Sil TS720. An exemplary hydrophilic colloidal material is fumed silica with a BET surface area of about 175–225 $m^2$/gm, nominal particle size of 0.012 μm, and a specific gravity of 2.2, available form the Cabot Corporation under the designation Cab-O-Sil M-5. Other colloidal fillers that may be useful in the practice of the invention are precipitated silicas and clays such as bentonites, with or without surface treatment. In the preferred embodiment, a hydrophobic fumed silica such as the Cab-O-Sil TS720 fumed silica in the amount of about 4 to 8 percent by weight is used as the inorganic thickening agent.

Oil retention of the filling material 26 may be improved by the addition of one of more organic thickening agents or bleed inhibitors to the composition. Copolymers used as bleed inhibitors are known to reduce the oil separation of a grease-like filling material, and, unlike fumed silica, does not contribute as much to increasing yield stress and viscosity.

The bleed inhibitor may be a block copolymer, a relatively high viscosity semiliquid, sometimes referred to as semisolid, rubber, or other appropriate rubber. Block copolymers and semiliquid rubbers may be referred to collectively as rubber polymers. Incorporating a rubber polymer into the grease-like composition of matter allows a reduction in the amount of colloidal particles that must be added to the mixture to prevent syneresis of the gel and can result in cost savings. Furthermore, it makes possible the formulation of non-bleeding compositions having a relatively low critical yield stress.

Among the block copolymers that can be used in waterblocking compositions for the cable of the invention are styrene-rubber and styrene-rubber-styrene block copolymers having a styrene/rubber ratio between approximately 0.1 and 0.8 and a molecular weight, as indicated by viscosity in toluene at 25° C., of from about 100 cps in a 20% b.w. rubber solution to about 2000 cps in a 15% b.w. rubber solution. Exemplary block copolymers are (a) a styrene-ethylene-propylene block copolymer (SEP), unplasticized, having a styrene/rubber ratio of about 0.59, a specific gravity of about 0.93, a break strength per ASTM D-412 of 300 psi, and being available from the Shell Chemical Company of Houston, Tex., under the trade designation Kraton G1701; (b) a styrene-ethylene-propylene block copolymer having a styrene to rubber ratio of about 0.39 and available from the Shell Chemical Company under the designation G1702; (c) styrene-ethylene butylene-styrene block copolymer (SEBS), unplasticized, and having a styrene/rubber ratio of about 0.16, a specific gravity of about 0.90, 750% elongation, 300% modulus per ASTM D-412 of 350 psi, and being available from the Shell Chemical Corporation under the trade designation Kraton G1657 and (d) a diblock copolymer of ethylene and propylene (EP) available from the Shell Chemical Company under the designation G1750. Another copolymer which may be used is Kraton 1726 copolymer which is a mixture of 30% styrene-ethylene butylene-styrene triblock copolymer (SEBS) and 70% styrene-ethylene butylene diblock copolymer (SEB). The preferred embodiment includes Kraton G 1701 block copolymer in an amount of about 6 percent by weight.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which comprises:
   a core comprising at least one optical fiber transmission medium;
   a sheath system which is disposed about said core; and
   a filling composition of matter which is disposed about the transmission medium in said core, said filling composition of matter comprising a hydrocarbon, a block copolymer, a colloidal filler and an antioxidant system which includes a hindered phenol sulfide in combination with a metal deactivator selected from the group consisting of dialkyldithiophosphates and diaryldithiophosphates.

2. The optical fiber cable of claim 1, wherein said antioxidant system comprises about 1.3 percent by weight of said filling composition.

3. The optical fiber cable of claim 1, wherein said hydrocarbon is aliphatic.

4. The optical fiber cable of claim 3, wherein said aliphatic hydrocarbon comprises a synthetic oil.

5. The optical fiber cable of claim 4, wherein said synthetic oil is selected from the group consisting of polyalphaolefin, polybutene and polypropene.

6. The optical fiber cable of claim 3, wherein said aliphatic hydrocarbon comprises a mineral oil.

7. A composition of matter for filling optical fiber cables comprising a hydrocarbon, a block copolymer, a colloidal filler and an antioxidant system which includes a hindered phenol sulfide in combination with a metal deactivator selected from the group consisting of dialkyldithiophates and diaryldithiophosphates.

8. The composition of matter of claim 7, wherein said antioxidant system comprises about 1.3 percent by weight of said filling composition.

9. The composition of matter of claim 7, wherein said hydrocarbon is aliphatic.

10. The composition of matter of claim 9, wherein said aliphatic hydrocarbon comprises a synthetic oil.

11. The composition of matter of claim 10, wherein said synthetic oil is selected from the group consisting of polyalphaolefin, polybutene and polypropene.

12. The composition of matter of claim 9, wherein said aliphatic hydrocarbon comprises a mineral oil.

* * * * *